US012726260B2

(12) United States Patent
Hochdorf et al.

(10) Patent No.: US 12,726,260 B2
(45) Date of Patent: Sep. 1, 2026

(54) DYNAMIC CHANNEL SELECTION FOR UNMANNED AERIAL VEHICLES

(71) Applicant: Skydio, Inc., San Mateo, CA (US)

(72) Inventors: Eyal Hochdorf, Palo Alto, CA (US); Tejaswy Hari, Milpitas, CA (US)

(73) Assignee: Skydio, Inc., San Mateo, CA (US)

( * ) Notice: Subject to any disclaimer, the term of this patent is extended or adjusted under 35 U.S.C. 154(b) by 662 days.

(21) Appl. No.: 18/124,288

(22) Filed: Mar. 21, 2023

(65) Prior Publication Data

US 2023/0299841 A1 Sep. 21, 2023

Related U.S. Application Data

(60) Provisional application No. 63/321,844, filed on Mar. 21, 2022.

(51) Int. Cl.
*H04B 7/185* (2006.01)
*B64U 20/80* (2023.01)

(52) U.S. Cl.
CPC ......... *H04B 7/18506* (2013.01); *B64U 20/80* (2023.01); *B64U 2201/20* (2023.01)

(58) Field of Classification Search
CPC ..... H04W 84/12; H04W 48/16; H04W 84/18; H04W 88/08; H04W 16/14; H04W 8/005; H04W 24/02; H04W 4/80; H04W 48/20
See application file for complete search history.

(56) References Cited

U.S. PATENT DOCUMENTS

| | | | | |
|---|---|---|---|---|
| 10,523,342 | B1 * | 12/2019 | Kuzdeba | H04B 17/27 |
| 2004/0264413 | A1 * | 12/2004 | Kaidar | H04W 48/16 370/332 |
| 2018/0059250 | A1 * | 3/2018 | Nakata | G01S 19/46 |
| 2023/0029256 | A1 * | 1/2023 | Huotari | H04W 48/12 |

FOREIGN PATENT DOCUMENTS

| | | | | |
|---|---|---|---|---|
| WO | WO-2008059365 | A2 * | 5/2008 | H04W 48/18 |

* cited by examiner

*Primary Examiner* — Khalid W Shaheed

(57) ABSTRACT

Technology is disclosed herein for dynamically selecting a communication channel for communication between an unmanned aerial vehicle and an access point. In an implementation, an unmanned aerial vehicle selects a current channel for communicating with an access point by performing a scan of the communication channels and, for each channel, generating a score based on performance metrics acquired during the scan. The communication channels are sorted into an ordered list according to the scores of the communication channels. The vehicle selects the first channel of the ordered list to be the current channel and periodically evaluates the channel performance against a performance threshold. Upon determining that the performance of the current channel is below the performance threshold, the vehicle evaluates the second channel from the ordered list.

20 Claims, 4 Drawing Sheets

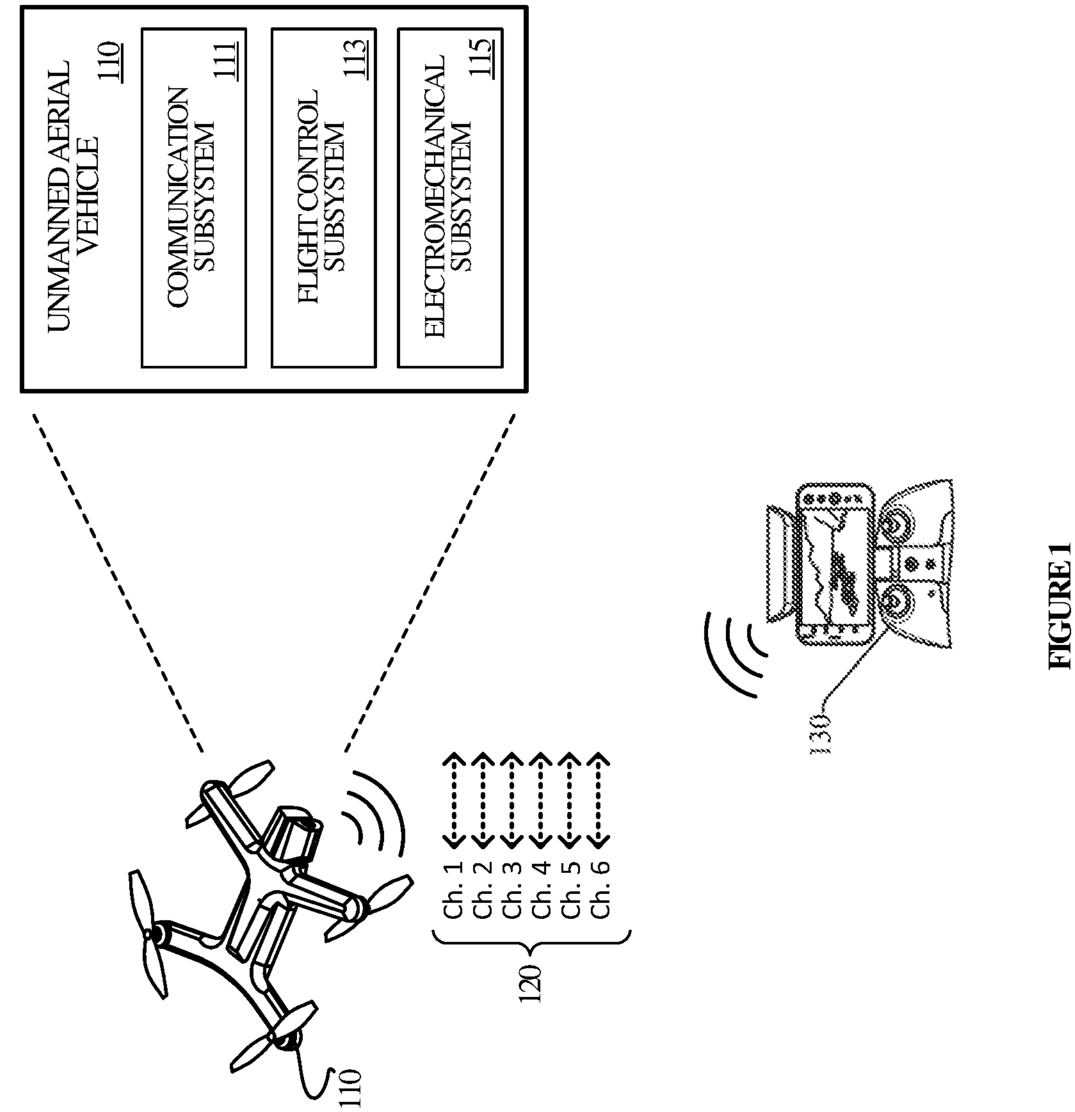
FIGURE 1

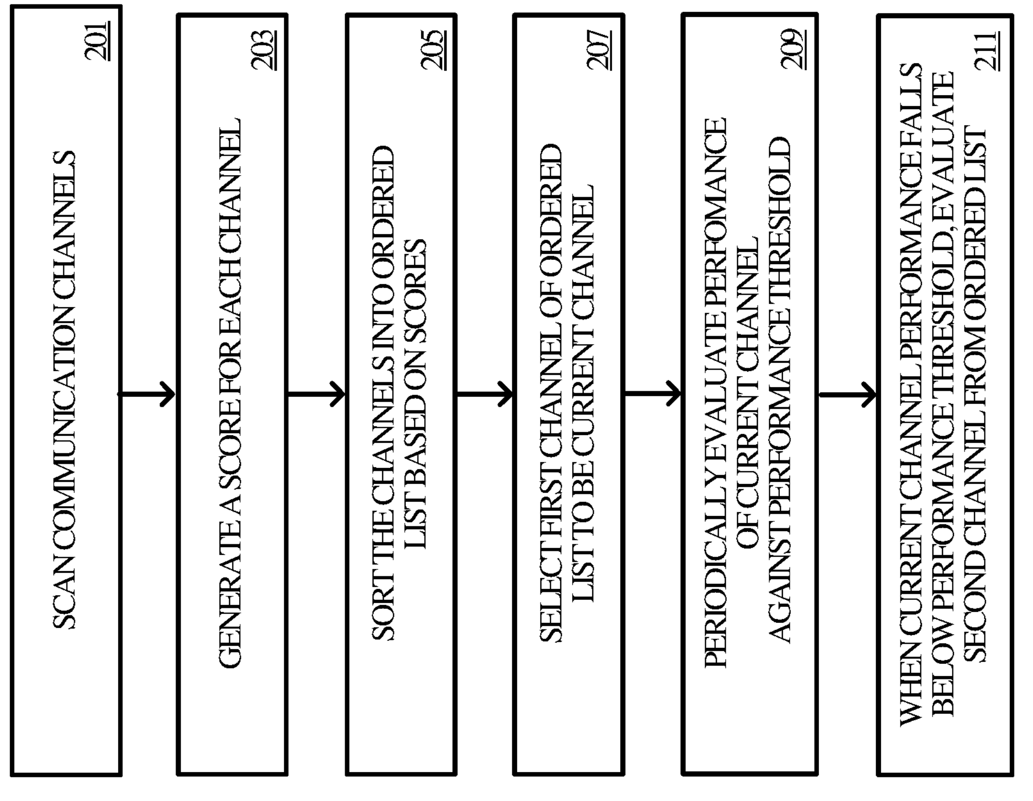
FIGURE 2

DYNAMIC CHANNEL SELECTION FOR UNMANNED AERIAL VEHICLES

RELATED APPLICATIONS

This application is related to—and claims the benefit of priority to—U.S. Provisional Patent Application No. 63/321,844, entitled DYNAMIC CHANNEL SELECTION, and filed on Mar. 21, 2022, the contents of which are hereby incorporated by reference in their entirety.

TECHNICAL FIELD

Various implementations of the present technology relate to communication with unmanned aerial vehicles (UAVs).

BACKGROUND

Unmanned aerial vehicles or drones rely on wireless communication to send and receive real-time data, such as receiving flight control commands when the vehicle is being active piloting or transmitting a livestream video feed for display on a smartphone. In many environments where drones are operated, drones will encounter a challenging background of RF interference which impacts their ability to communicate with a base station or remote controller. For example, in suburban areas, a drone flying overhead will encounter RF signals from devices such as Wifi routers, cellular devices, wireless security systems, and the like, but also from less sophisticated devices such as microwave ovens, baby monitors, and garage door openers. In addition to these are environmental sources, such as power lines, radio or cellular towers, and other sources of electromagnetic interference, but also structures such as buildings which block, reflect, or amplify RF signals. Moreover, there is an ever-increasing number of IoT devices in use which further contribute to the RF environment. This noisy environment impacts the ability of the drone to communicate reliably with its ground station by degrading the quality of communications in terms of reduced signal strength, bit rate errors, and lost data packets.

To provide reliable communication between a drone and a ground station or remote controller, the drones will employ channel switching-switching from one channel to another when RF interference causes excessive signal degradation. However, when flying in an area with a rapidly changing RF profile, frequent channel switching can itself be a disruptive process which causes latency or interruption in communications. Channel switching may also result in switching to a more congested channel.

Overview

Systems, methods, and software are disclosed herein for dynamically selecting a communication channel for communication between an unmanned aerial vehicle and an access point. In an implementation, an unmanned aerial vehicle selects a current channel for communicating with an access point from among communication channels. Selecting the current channel includes performing a scan of the communication channels and, for each channel, generating a score based on performance metrics acquired during the scan. The communication channels are sorted into an ordered list according to the scores of the communication channels; the ordered list includes first, second, and third channels corresponding to the channels with the best score, second-best score, and third-best score, respectively. The vehicle selects the first channel of the ordered list to be the current channel and periodically evaluates the performance of the current channel against a performance threshold. Upon determining that the performance of the current channel is below the performance threshold, the vehicle selects the second channel from the ordered list to be the current channel for communications with the access point.

In an implementation, upon determining that the performance of the current channel is below the performance threshold, the vehicle selects the third channel of the ordered list to be the current channel. In the same or other implementations, upon determining that the performance of the current channel is below the performance threshold, the vehicle re-selects the current channel from among the communication channels and periodically evaluates the performance of the current channel against the performance threshold.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 illustrates an operational environment of operating an unmanned aerial vehicle in communication with an access point in an implementation.

FIG. 2 illustrates a method of channel selection for communication between an unmanned aerial vehicle and an access point in an implementation.

Figure 3:
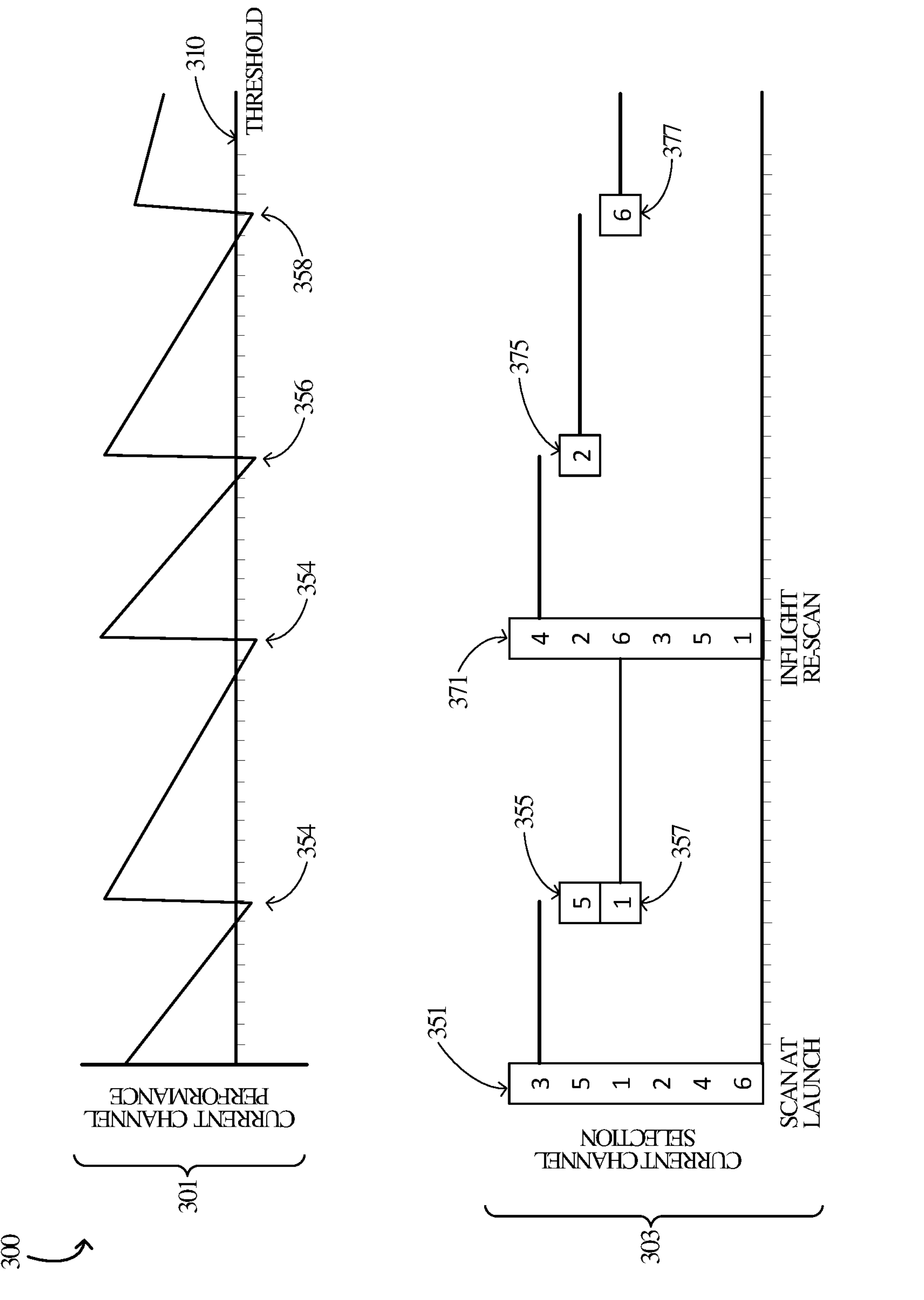
FIG. 3 illustrates an operational scenario of dynamically selecting a channel for communication between an unmanned aerial vehicle and an access point in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The technology disclosed herein is a wireless feature intended to improve communication performance between ground control, e.g., a controller, and a drone (or UAV), when the drone is in flight. The techniques described here are directed dynamic channel selection. Dynamic channel selection is a mechanism that will periodically and continually scan the environment to find a better channel if the current channel degrades or drop below a threshold level of communication performance. The examples discussed herein are primary directed to Wifi channels; however, other channel-based technologies would also benefit from the technology described herein.

When a UAV (or drone) boots up, it scans and selects the best channel, i.e., the channel that provides the best communication performance between the ground control and the drone. This communication channel remains static throughout the flight. Unfortunately, the interference (or interference profile) seen by the drone on bootup is typically much different than once the drone is in flight. These differing interference profiles can be caused as a result of a number of environmental values including, but not limited to, objects that block the line of sight between the drone and the controller during flight. Additionally, since the controller (or ground control) and the drone (or vehicle) are at different locations, they see a different interference profiles across channels.

The technology described herein improves the initial channel selection and dynamically re-selects a channel during flight (periodically, continually, or based on some trigger) to ensure that the selected channel is optimal. In some implementations, the optimal channel may not always be the channel with the highest communication performance. However, the technology described herein ensures that communication performance is as good or better than it needs to be (e.g., better than a threshold or the best available communication channel).

In some implementations, the channel with the best communication performance is selected or re-selected periodically, continually, or based on some trigger (e.g., performance falls below a threshold). In some implementations, the channel selection takes into account interference profiles at both the drone and the controller (or ground control).

In an example process for scanning on the vehicle (UAV), the vehicle gets the initial scan data on boot up via the auto channel selection in the Wi-Fi driver, and the process generally proceeds as follows:

Sort the data based on the channel score and make note of the best two channels other than the current channel.

Scan the current channel every second, recalculate the channel score and sort the channel list again.

If the current channel score exceeds a static threshold, initiate a scan on the next best channel and calculate that channel's score. If this channel score is lower than a static scan channel threshold, it is established that this channel is better. The drone switches to this channel and the controller follows it.

If the scanned channel score is worse than the current channel score, repeat the process for the second best channel in the list.

If both the channels have higher score, continue on the current channel and wait for a specific amount of time to redo the scanning process.

In an example process for scanning from the controller (ground station), the controller will also have channel scan enabled and will have a similar channel weight list updated every second. The process generally proceeds as follows:

This list is transferred over to the drone via Wi-Fi data packet.

The vehicle receives the frame and adds the controller channel score to the drone channel score.

The combined score is used for channel evaluation so it covers the interference seen at both drone and vehicle.

Technology is disclosed herein to optimize communication between an unmanned aerial vehicle (UAV) and an access point such as a ground station or remote controller. (Hereinafter, the terms "vehicle" and "drone" are used interchangeably with "UAV.") In an implementation, a vehicle in wireless communication with an access point performs an initial scan of multiple communication channels to capture data relating to radiofrequency (RF) interference. The scan, performed at the time the vehicle is launched, generates performance data relating to interference for each channel. The vehicle sorts the channels into an ordered list from best performance (i.e., least interference) to worst performance (i.e., most interference). The initial list provides a seeding by which the vehicle dynamically selects channels during flight. At launch, the vehicle selects the first or best scoring channel from the list for communication with the access point.

During flight, the vehicle (or a communication subsystem of the vehicle) periodically evaluates or rescores the performance of the selected channel with respect to interference. If the vehicle detects that the performance of selected channel has degraded such that its score has fallen below a threshold value or outside a range of acceptable performance, the vehicle evaluates the second channel from the initial list (i.e., the second-best performing channel to determine whether its performance is satisfactory. If satisfactory performance of the second channel is confirmed, the vehicle selects the channel for communication with the access point and transmits the updated channel selection to the access point. To determine whether the second channel is satisfactory for communication, the vehicle may determine that the performance of the second channel is better than the performance of the first channel or that the second channel is within the range of satisfactory performance.

Continuing with the exemplary scenario, the vehicle continues to periodically evaluate the performance of the selected communication channel for degradation due to RF interference. If the vehicle determines that the selected channel has degraded below a predetermined performance threshold, the vehicle selects the third channel from the initial list and evaluates its performance. Upon detecting that the third channel has superior performance to the second channel or is within the range of acceptable performance, the vehicle selects the third channel for communication and transmits the updated channel selection to the access point.

In various implementations, if the vehicle determines that the first, second, and third channels are unsatisfactory for communication, the vehicle performs a scan of available channels to establish a new list or seeding for channel selection according to channel scores indicative of RF interference. The vehicle selects the first channel of the new list for communication with the access point and transmits the channel selection to the access point. In some implementations, the vehicle maintains its use of the current selected channel and waits a predetermined period of time to perform the scan.

The channels by which the vehicle communicates with an access point include Wifi channels in the 2.4 GHz band and/or 5 GHz band. To evaluate the performance of the channels, the vehicle cycles through the individual channels in the applicable band(s) and gathers multiple metrics relating to interference for each channel. These metrics include (but are not limited to): an RF noise floor, a percentage of clear airtime, a BSS (Basic Service Set) count, an RSSI (Received Signal Strength Indication) metric, and a physical layer error count. In an implementation, the vehicle generates a scaled score based on the raw data captured during the scan, then applies a weighting profile to the set of scores to produce a set of weighted scores. The weighted scores are summed to produce a channel score which is indicative of the level of RF interference received or detected on that channel, such that a low-scoring channel will be expected to have less interference than a high-scoring channel. The vehicle orders the channels according to the channel score to produce a channel list.

In various implementations, while the vehicle in flight, the vehicle reevaluates the performance of the current channel periodically, such as every second. When the performance of the current channel falls below a performance threshold, the vehicle evaluates the performance of the next channel on the list to obtain a fresh reading of RF interference on that channel. If the channel exhibits poorer performance (i.e., greater interference) than the previous channel, the communication subsystem moves to the next channel on the list for evaluation and possible selection.

In various implementations, the number of channels evaluated or selected before the vehicle reseeds the channel list may vary from three as described in the above exemplary scenario. For example, the vehicle may step through the first five channels of the channel list and, upon determining that none of the five channels are satisfactory, perform a re-scan of all available channels to produce a new channel list. The number of channels which the vehicle steps through on the channel list before performing a rescan may be determined based on the noisiness of the environment or on the type of operations the vehicle is tasked with performing. For example, in a noisy environment, the vehicle may perform rescans more frequently, while in a quiescent RF environment, the vehicle may perform rescans less frequently.

In some implementations, the access point, such as a vehicle remote controller or ground station, performs a scan of all available channels and generates weighted channel scores which it transmits to the vehicle. The vehicle combines the channel scores produced by the access point with the scores produced by the vehicle, such as by averaging the pair of scores for each channel, and generates the channel list based on the averages of the channel scores. In still other implementations, the access point also produces and sends an ordered channel list to the vehicle by which the vehicle makes its channel selections.

Because the process of scanning a communication channel can be disruptive to the regular communication activities of the vehicle, such as transmission of video captured by onboard cameras, the technology described herein optimizes the process of channel selection by minimizing the number of channel scans that must be performed to find a satisfactory channel. For example, scanning six to eight Wifi channels may take 65-70 milliseconds or longer, reducing communication throughput and disrupting vehicle operations which rely on low-latency communication, such as receiving real-time flight commands from a ground controller or transmitting live video. In an environment with significant RF interference, this may result in the access point receiving jagged or delayed video feeds from the vehicle. By generating an ordered list of channels, the vehicle scans just one channel when moving to the next channel on the list, consuming much less time (roughly 15 milliseconds per channel) and throughput and causing less disruption of other vehicle operations. Moreover, the need to re-scan all of the available channels is delayed and/or reduced by leveraging the information gained from the initial scan or subsequent rescans.

Turning now to the Figures, FIG. 1 illustrates operational environment 100 of a UAV in communication with an access point in an implementation. FIG. 1 includes vehicle 110 in wireless communication with access point 130. Vehicle 110 includes communication subsystem 111, flight control subsystem 113 and electromechanical subsystem 115.

Vehicle 110 is representative of an unmanned aerial vehicle capable of communicating with access point 130 over a wireless communication network. Communication subsystem 111 is representative of functionality onboard vehicle 110 for communication with access point 130 and which includes logic by which to select communication channels for communication with access point 130 according to the technology disclosed herein. Communication subsystem 111 may be implemented in software and hardware including transmitters, receivers, antennas, and signal converters. Communication between vehicle 110 and access point 130 may be carried by data links transmitting digital data via RF, satellite, cellular, Wifi, Bluetooth, or other communication channels according to communication protocols such as TCP/IP. Data transmitted between vehicle 110 and access point 130 can include flight control commands, sensor data, imagery, video, and telemetry data. Data exchanged between vehicle 110 and access point 130 may be encrypted or encoded to protect the data and prevent unauthorized access.

Vehicle 110 also includes flight control subsystem 113 which controls the movement, stability, and orientation of vehicle 110 in flight. Flight control subsystem 113, implemented in hardware and software onboard vehicle 110, includes a flight controller which integrates a flight plan or flight path with onboard sensor data from devices such as inertial measurement units, GPS (Global Positioning System) sensors, and environmental sensors, to generate flight control commands for electromechanical subsystem 115. Electromechanical subsystem 115 includes an electronic speed controller, rotors, and battery system to fly vehicle 110 according to the flight commands provided by flight control subsystem 113.

Access point 130 is representative of a base station, ground station, or remote controller in communication with vehicle 110 via RF, satellite, cellular, Wifi, Bluetooth, or other wireless communication channels. Access point 130 may be a dedicated device, or it may be an application on a mobile computing device such as a smart phone, tablet or laptop computer. Access point 130 may include functionality by which to perform a scan of communication channels by which it can communicate with vehicle 110 and generate channel scores.

In an operational scenario, vehicle 110 launches from a docking station. At launch, communication subsystem 111 performs a scan of Wifi channels 120 of vehicle 110's operable Wifi band. Communication subsystem 111 generates a channel score for each of the scanned channels based on a set of RF interference metrics. The channel score for a given channel is indicative of the level of RF interference detected on the given channel. Communication subsystem 111 creates an ordered list of the scanned channels according to the channel scores, that is, in order of least interference to most interference. Communication subsystem 111 selects the first channel (i.e., the channel with the best channel score) for communication with access point 130 and sends the channel selection to access point 130.

To generate a channel score for a given channel, communication subsystem 111 receives the captured scan data for each metric of the set of metrics and computes a scaled score for each metric. Communication subsystem 111 applies a predetermined weighting profile to the set of scaled scores by multiplying each scaled score to its corresponding weight, resulting in a set of weighted scores. Communication subsystem 111 sums the weighted scores to produce a channel score for the given channel.

Having selected a channel from the channel list to be the current communication channel, communication subsystem 111 monitors the performance of the selected channel by periodically rescoring the selected channel. As vehicle 110 is in flight, the RF environment may change, sometimes substantially, which in turn will alter the channel scores of the selected and other channels. If/when communication subsystem 111 detects that the channel score of the current channel has fallen out of a range of acceptable values or exceeded a performance threshold, communication subsystem 111 selects the second channel (i.e., the next best channel) on the channel list and generates an up-to-date score for the channel.

If communication subsystem 111 determines the score of the second channel to be better than that of the previous channel, communication subsystem 111 uses the second channel as the current channel for communication with access point 130 and monitors the second channel until such time as it detects a degradation in performance (e.g., the current channel performance falls out of the range of acceptable scores). If, however, the score of the second channel at the time it is selected is worse than that of the previous channel, communication subsystem 111 then selects the third channel on the list and generates an up-to-date score for the third channel.

Upon moving to the third channel on the channel list, communication subsystem 111 evaluates the performance of the third channel at the time it is selected to determine if it is satisfactory for communication. If satisfactory, communication subsystem 111 uses the third channel as the current channel for communication with access point 130 and monitors the performance of the third channel until such time as it detects that communication has become unsatisfactory according to the latest channel score. If/when communication subsystem 111 detects that the third channel is unsatisfactory (at the time of selection or while in use), communication subsystem 111 again re-scans Wifi channels 120, generates a new set of channel scores, and produces an updated channel list based on the new scores. In some implementations, communication subsystem 111 performs the re-scan at a time when it determines that scanning Wifi channels 120 will be less disruptive or minimally disruptive to other vehicle operations. Communication subsystem 111 then selects the first (i.e., best-scoring) channel from the updated list to be the current channel.

Turning to FIG. 2, FIG. 2 illustrates process 200 implemented by an unmanned aerial vehicle, such as vehicle 110 of FIG. 1, to dynamically select communication channels for communication with an access point, such as a base station or remote control device, in an implementation. The program instructions direct the one or more computing devices to operate as follows, referring parenthetically to the steps in FIG. 2.

In operation, a vehicle scans the available communication channels for communication with an access point (step 201). In an implementation, the vehicle may perform the scan at launch or during flight. To scan a communication channel, the vehicle selects the channel and monitors transmissions on the channel from various sources of RF signals over a residence or dwell time (e.g., 15 milliseconds). During the scan, the vehicle records a set of scan data or metrics which quantify the RF signals received by the vehicle.

The vehicle generates a score for each channel based on the set of metrics collected for the channel during the dwell time (step 203). For a given channel, each metric comprises a quantity related to or indicative of RF interference on the given channel. The metrics may include an RF noise floor, a percentage of airtime clear of RF interference, a BSS count, an RSSI metric, and/or a physical layer error count. The RF noise floor is a measure of the signal created from the sum of all the noise sources and unwanted signals as detected by the onboard receiver. The RF noise floor can include both external noise from RF-emitting devices (e.g., Wifi routers in the area) and internal noise generated by various components onboard the vehicle. The percentage of airtime clear of RF interference is a percentage of the dwell time during which RF noise is undetected or is below a certain level. The BSS count is a measure of the number of RF signal sources detected by the receiver. The RSSI is a measure of RF signal energy received by the receiver. The physical layer error count is a metric relating to the number of errors occurring in the RF and/or PHY ("physical") layer(s) of the communication channel which correspond to the first layer of the OSI (Open Systems Interconnect) model.

Having captured a set of metrics relating to RF interference for a particular channel, the communication subsystem generates a scaled score for each metric, such as a value between 0 and 100 where, for example, a higher value reflects more interference. The communication subsystem then weights the scaled scores according to weighting profile. For example, each metric may be weighted according to a fraction or percentage of the overall channel score such that the sum of the weights is 1 or 100%. The weighted scores are summed to produce a channel score.

With a channel score determined for each of the scanned channels, the vehicle sorts the channels into a list from best performance (lowest interference score) to worst (highest performance score). An ordered list of channel scores ordered from best to worst may be, for a simple example, 5, 10, 12, 26, 38, and 47, with the lower scores indicative of channels with better performance with respect to RF interference as compared to the channels with higher scores.

With channel scores sorted into an ordered list, the vehicle selects the first channel from the list to be the current channel for communication with the access point (step 207). Continuing with the previous example, the vehicle selects the channel corresponding to the lowest score (5) as the current channel. With the channel selected, the vehicle continually monitors the performance of the current channel by periodically rescoring the channel (step 209), by collecting an updated set of interference metrics and calculating a new channel score at intervals of one second, for example.

As the vehicle monitors the performance of the current channel, it compares the updated channel score to a predetermined performance metric. If the updated channel score falls outside the range of satisfactory or acceptable performance, the vehicle evaluates the next channel on the list (step 211). For example, if the performance threshold is set to 50 (in other words, if the range of satisfactory performance is 0 to 50) and if the performance of the first channel falls from 5 to, say, 62, the vehicle will select the next channel (corresponding to the score of 10) and rescore the second channel to determine its current performance relative to the previous channel or to a performance threshold. If the performance of the next channel is better than that of the previous channel or satisfactory with respect to the performance threshold, the vehicle uses the next channel as its current channel for communication with the access point.

It may be appreciated that in some implementations, the raw interference data may be inversely scaled such that higher scaled and channel scores correspond to better performance (with performance degradation due to interference resulting in lower scores) with no loss of generality.

Referring again to FIG. 1, operational environment 100 illustrates a brief example of process 200 as employed by vehicle 110 in an implementation. At launch, vehicle 110 performs a scan of available channels of communication with access point 130. Vehicle 110 generates a set of channel scores for the scanned channels based on interference data gathered for each channel as it was scanned. Vehicle 110 generates a channel list based on the channel scores such that the channels are ordered from best performance to worst performance. Vehicle 110 then selects the first or best-performing channel for communication with access point 130.

During flight, vehicle 110 periodically evaluates the performance of the selected channel with respect to RF interference by generating an updated score for the channel. Should vehicle 110 detect that the score of the selected channel has fallen out of a range of satisfactory or acceptable performance, vehicle 110 evaluates the next channel on the list for communication with access point 130. Vehicle 110 generates an updated channel score for the next channel to determine its feasibility for communication by comparing the updated score to the performance threshold or to the performance of the previous channel. If, for example, the current channel exhibits better performance than the previous channel, then the vehicle selects the next channel as its current channel for communication with access point 130 and continues to monitor the current channel until such time as its performance degrades, such as by falling outside the range of satisfactory performance.

Turning now to FIG. 3, FIG. 3 illustrates operational scenario 300 of channel selection by a UAV for communication with an access point in an implementation. Operational scenario 300 includes performance chart 301 which illustrates the channel performance of the current channel over time, such as the performance as indicated by a periodically determined channel score. Graph 303 illustrates a channel selection scenario according to the technology disclosed herein, where the time scale of graph 303 corresponds to the time scale of performance chart 301.

In operation scenario 300, a UAV, of which vehicle 110 of FIG. 1 is representative, performs, at launch, scan 351 of available channels to select a channel for communication with an access point. Based on interference data collected during scan 351, the UAV scales, weights, and sums the interference data to generate a channel score such that a higher channel score corresponds to less RF interference and better communication performance, and vice versa. The UAV then generates a channel list ordering the channels from best performance to worst performance (in this example, the best performing channel is channel 3 the worst is channel 6).

Having determined channel 3 to have the best performance or least interference at launch, the UAV selects channel 3 to be the current channel. In flight, the UAV periodically monitors the performance of the current channel by recalculating a channel score every second. As the UAV traverses an area, the RF interference of the environment may vary causing communication performance on the current channel (and the other communication channels) to change. At time 354, or about eight seconds into flight, the UAV detects that the performance of the current channel (channel 3) has fallen below performance threshold 310. The UAV evaluates the performance of the next best performing channel, channel 5.

To evaluate channel 5, the UAV performs scan 355 of channel 5 and calculates an up-to-date channel score. The UAV then determines, based on the up-to-date channel score, that the performance of channel 5 is worse than that of the previous channel. The UAV then evaluates the third-best channel, channel 1. The UAV performs scan 357 of channel 1, determines that the performance of channel 1 is superior to that of the channel 3, and proceeds to select channel 1 to be the current channel for communication with the access point.

Continuing with operational scenario 300, at time 354, the performance of the current channel (channel 1) has fallen below performance threshold 310. Having run through the first three channels of initial scan 351, the UAV performs re-scan 371 of the available channels and generates a new ordered channel list based on updated channel scores. The updated list indicates that channel 4 now exhibits the best performance, and the UAV selects channel 4 to be the current channel.

At time 356, the UAV detects that the performance of channel 4 has fallen below performance threshold 310 and evaluates the next best channel according to the new channel list, channel 2. The UAV performs scan 375 for channel 2 which demonstrates satisfactory performance and proceeds with selecting channel 2 to be the current channel for communication with the access point.

At time 358, the performance of the current channel 2 has degraded due to RF interference, and the UAV evaluates the next channel (channel 6) on the channel list from re-scan 371. The UAV performs scan 377 to ascertain the current performance of the channel 6 and, upon determining satisfactory performance on that channel based on its updated channel score, proceeds to use it for communication with the access point.

In some scenarios, rescanning available channels to generate a new channel list may be too disruptive to other vehicle operations. In such cases, the UAV may go to other channels on the existing channel list. So, for example, if the order of the list is 3, 5, 1, 2, 4, 6, and if the current channel 1 degrades, the UAV goes back to channel 3. If degradation still exists on channel 3, rather than performing a rescan, the UAV skips channels 5 and 1 and evaluates channel 2, then channel 4. In still other scenarios, subsequent to degradation on channel 1, the UAV steps through the remaining channels on the list (2, 4, 6). If the UAV reaches the end of the existing channel list and the last channel (channel 6) becomes unsatisfactory, the UAV goes back to the beginning of the list and evaluates channel 3.

Figure 4:
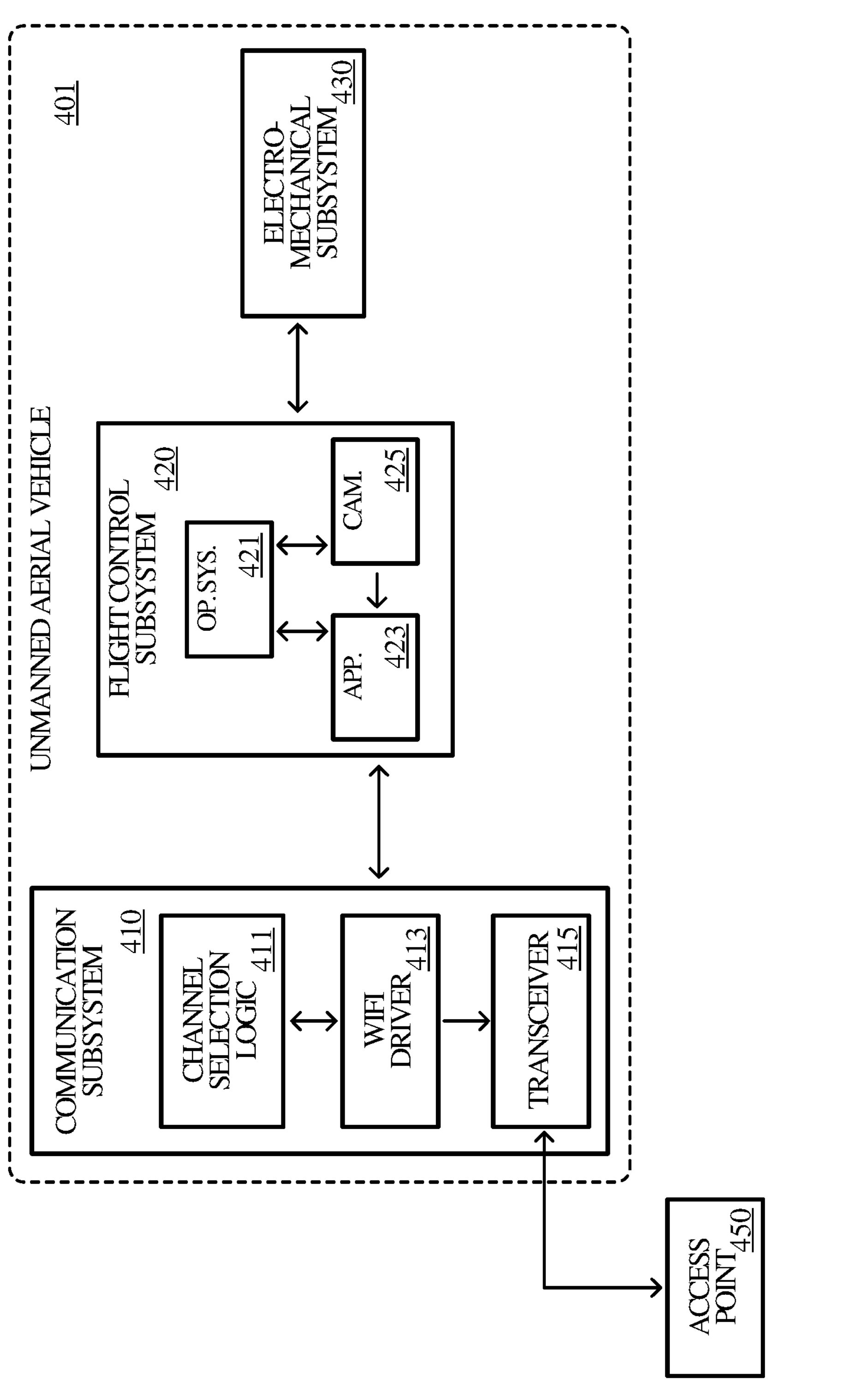
FIG. 4 illustrates a systems architecture of a UAV in an implementation.

FIG. 4 illustrates systems architecture 400 of vehicle 401, of which vehicle 110 of FIG. 1 is representative, in an implementation. Systems architecture 400 of vehicle 401 includes communication subsystem 410, flight control subsystem 420, and electromechanical system 430.

Communication subsystem 410 includes channel selection logic 411, Wifi driver 413, and transceiver 415. Channel selection logic 411, implemented in software and hardware components, includes program instructions by which vehicle 401 performs channel selection for communication with access point 450 according to the technology disclosed herein, such as process 200. Channel selection logic 411 communicates with Wifi driver 413 to receive interference data for the communication channels available to vehicle 401 and to return a channel selected based on a channel selection process, such as process 200 of FIG. 2. Wifi driver 413 receives interference data for the communication channels from transceiver 415 and sends the interference data to channel selection logic 411. Transceiver 415 sends and receives wireless communication from access point 450. It may be appreciated that in some implementations channel selection logic 411 may be implemented in Wifi driver 413.

Flight control subsystem 420 includes operating system 421, application software 423, and camera 425. Operating system 421, executed by a flight control processor (not shown) of flight control subsystem 420, controls the operation of the various components of flight control subsystem 420 including application software 423 and camera 425 as well as components of communication subsystem 410 and electromechanical subsystem 430. Camera 425 is representative of one or more cameras or devices for capturing imaging data, such as video or still photography, across visible and other wavelengths of the electromagnetic spectrum, such as ultraviolet or infrared wavelengths.

Flight control subsystem 420 may also include various sensors, such as an inertial measurement unit sensor, GPS sensor, and environmental sensors such as altimeters, barometers, and anemometers. Flight control subsystem may also include data storage such as persistent or nonvolatile memory or a removeable memory card (e.g., an SD card) for recording flight and sensor data gathered from onboard devices, including photos or video captured by onboard cameras.

Electromechanical system 430 provides the propulsion for vehicle 401, typically including an electronic speed controller which throttles one or more rotors according to flight instructions received from flight control subsystem 420. It may be appreciated that both flight control subsystem 420 and electromechanical subsystem 430 can include other elements in addition to (or in place of) those disclosed herein, which are illustrated for exemplary purposes.

In an operational scenario, camera 425 captures video data for transmission to access point 450. Camera 425 transmits the captured video to application software 423 for post-processing operations such as filtering, compression, and encoding. Application software 423 sends to Wifi driver 413 the processed video data for transmission to access point 450. Wifi driver 413 configures the video data for transmission by transceiver 415 via a Wifi data link to access point 450. Communication between vehicle 401 and access point 450 over the Wifi data link between communication subsystem 410 and access point 450 occurs over a Wifi channel selected by channel selection logic 411 from among multiple Wifi channels and implemented by Wifi driver 413.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to:" As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:

by a communication system onboard an unmanned aerial vehicle:

selecting a current channel from among multiple channels for communication with an access point, wherein selecting the current channel comprises:

performing a scan of the multiple channels;

for each channel of the multiple channels, generating a score based on performance metrics acquired during the scan, wherein the performance metrics include a percentage of clear airtime and a physical layer error count, wherein generating the score comprises determining the performance metrics and summing the performance metrics for the given channel, and wherein determining the performance metrics comprises:

capturing scan data indicative of the percentage of clear airtime, the physical layer error count, a noise floor, a BSS count, and an RSSI metric;

scaling the scan data to a value between 0 and 100, resulting in scaled data; and applying a weight to the scaled data, wherein the weight is determined according to a performance profile;

sorting the multiple channels into an ordered list according to the scores of the channels, wherein the ordered list includes a first channel corresponding to a channel with a best score relative to others of the scores, a second channel corresponding to a channel with a second-best score relative to others of the scores, and a third channel corresponding to a channel with a third-best score relative to others of the scores; and selecting the first channel of the ordered list to be the current channel for communication with the access point;

periodically evaluating a performance of the first channel against a performance threshold; and upon determining that the performance of the first channel is below the performance threshold, evaluating a performance of the second channel of the ordered list.

2. The method of claim 1, further comprising selecting the second channel of the ordered list to be the current channel for communication with the access point based on the performance of the second channel.

3. The method of claim 2, further comprising, upon determining that the performance of the second channel is below the performance threshold, evaluating a performance of the third channel of the ordered list, and selecting the third channel of the ordered list to be the current channel for communication with the access point based on the performance of the third channel, wherein periodically evaluating the performance of the first channel, evaluating the performance of the second channel, and evaluating the performance of the third channel occurs during a flight of the unmanned aerial vehicle.

4. The method of claim 3, further comprising:

upon determining that the performance of the third channel is below the performance threshold, re-selecting the current channel from among the multiple channels and periodically evaluating the performance of the current channel against the performance threshold.

5. The method of claim 1, wherein generating a score for a given channel further comprises adding an access point score associated with the access point to the score.

6. The method of claim 5, wherein the noise floor comprises metrics from a plurality of noise sources including one or more of: one or more components onboard the unmanned aerial vehicle and one or more components external to the unmanned aerial vehicle.

7. The method of claim 6, wherein the percentage of clear airtime corresponds to a percentage of dwell time during which radio frequency noise falls below a threshold noise level, and wherein the physical layer error count corresponds to a number of errors occurring in a radio frequency or physical layer of the current channel.

8. The method of claim 5, further comprising:

receiving, from the access point, a channel score generated by the access point for the given channel; and wherein generating the score for the given channel based on the performance metrics acquired during the scan further comprises averaging the channel score generated by the access point for the given channel with the score for the given channel generated based on performance metrics acquired during the scan.

9. An unmanned aerial vehicle comprising:

a communication system onboard the unmanned aerial vehicle comprising one or more processors; and one or more non-transitory computer readable storage media having program instructions stored thereon that, when executed by the one or more processors of the communication system, direct the communication system to at least:

select a current channel from among multiple channels for communication with an access point, wherein to select the current channel, the program instructions direct the communication system to:

perform a scan of the multiple channels;

for each channel of the multiple channels, generate a score based on performance metrics acquired during the scan, wherein the performance metrics include a percentage of clear airtime and a physical layer error count, wherein to generate the score, the program instructions direct the communication system to determine the performance metrics and sum the performance metrics for the given channel, and wherein to determine the performance metrics, the program instructions further direct the communication system to:

capture scan data indicative of the percentage of clear airtime, the physical layer error count, a noise floor, a BSS count, and an RSSI metric;

scale the scan data to a value between 0 and 100, resulting in scaled data; and apply a weight to the scaled data, wherein the weight is determined according to a performance profile;

sort the multiple channels into an ordered list according to the scores of the multiple channels, wherein the ordered list includes a first channel corresponding to a channel with a best score relative to the other scores, a second channel corresponding to a channel with a second-best score relative to the other scores, and a third channel corresponding to a channel with a third-best score relative to the other scores; and select the first channel of the ordered list to be the current channel;

periodically evaluate performance of the current channel against a performance threshold; and upon determining that the performance of the current channel is below the performance threshold, evaluate a performance of the second channel of the ordered list.

10. The unmanned aerial vehicle of claim 9, wherein the program instructions further direct the communication system to select the second channel of the ordered list to be the current channel for communication with the access point based on the performance of the second channel.

11. The unmanned aerial vehicle of claim 10, wherein the program instructions further direct the communication system to:

upon determining that the performance of the second channel is below the performance threshold, evaluate a performance of the third channel of the ordered list, and, based on the performance of the third channel, select the third channel of the ordered list to be the current channel for communication with the access point;

wherein to periodically evaluate the performance of the current channel, to evaluate the performance of the second channel, and to evaluate the performance of the third channel, the program instructions direct the communication system to evaluate a respective channel during a flight of the unmanned aerial vehicle.

12. The unmanned aerial vehicle of claim 11, wherein the program instructions further direct the communication system to:

upon determining that the performance of the third channel is below the performance threshold, re-select the current channel from among the multiple channels and periodically evaluate the performance of the current channel against the performance threshold.

13. The unmanned aerial vehicle of claim 9, wherein to generate the score for a given channel, the program instructions direct the communication system to add an access point score associated with the access point to the score.

14. The unmanned aerial vehicle of claim 13, wherein the noise floor comprises metrics from a plurality of noise sources including one or more of: one or more components onboard the unmanned aerial vehicle and one or more components external to the unmanned aerial vehicle.

15. The unmanned aerial vehicle of claim 14, wherein the percentage of clear airtime corresponds to a percentage of dwell time during which radio frequency noise falls below a threshold noise level, and the physical layer error count corresponds to a number of errors occurring in a radio frequency or physical layer of the current channel.

16. The unmanned aerial vehicle of claim 13, wherein the program instructions further direct the communication system to:

receive, from the access point, a channel score generated by the access point for the given channel; and wherein to generate the score for the given channel based on the performance metrics acquired during the scan, the program instructions further direct the communication system to average the channel score generated by the access point for the given channel with the score for the given channel generated based on the performance metrics acquired during the scan.

17. One or more non-transitory computer readable storage media having program instructions stored thereon that, when executed by one or more processors operatively coupled to the one or more computer readable storage media, direct a computing device to at least:

select a current channel from among multiple channels for communication by a communications system onboard an unmanned aerial vehicle with an access point, wherein to select the current channel, the program instructions direct the computing device to:

perform a scan of the multiple channels;

for each channel of the multiple channels, generate a score based on performance metrics acquired during the scan, wherein the performance metrics include a percentage of clear airtime and a physical layer error count, wherein to generate the score, the program instructions direct the computing device to determine the performance metrics and sum the performance metrics for the given channel, and wherein to determine the performance metrics, the program instructions further direct the computing device to:

capture scan data indicative of the percentage of clear airtime, the physical layer error count, a noise floor, a BSS count, and an RSSI metric;

scale the scan data to a value between 0 and 100, resulting in scaled data; and apply a weight to the scaled data, wherein the weight is determined according to a performance profile;

sort the multiple channels into an ordered list according to the scores of the multiple channels, wherein the ordered list includes a first channel corresponding to a channel with a best score relative to the other scores, a second channel corresponding to a channel with a second-best score relative to the other scores, and a third channel corresponding to a channel with a third-best score relative to the other scores; and select the first channel of the ordered list to be the current channel;

periodically evaluate performance of the current channel against a performance threshold; and upon determining that the performance of the current channel is below the performance threshold, evaluate the second channel of the ordered list.

18. The one or more non-transitory computer readable storage media of claim 17, the program instructions further directing the computing device to select the second channel of the ordered list to be the current channel for communication with the access point.

19. The one or more non-transitory computer readable storage media of claim 18, the program instructions further directing the computing device to, upon determining that the performance of the current channel is below the performance threshold, select the third channel of the ordered list to be the current channel for communication with the access point.

20. The one or more non-transitory computer readable storage media of claim 19, the program instructions further directing the computing device to, upon determining that the performance of the current channel is below the performance threshold, re-select the current channel from among the multiple channels and periodically evaluate the performance of the current channel against the performance threshold.

* * * * *